Oct. 26, 1937.  F. JUDGE  2,096,810

THREAD CUTTING DEVICE

Filed Sept. 25, 1935  3 Sheets-Sheet 1

INVENTOR
Franklin Judge
BY
Edwards, Bower and Pool
ATTORNEYS

Oct. 26, 1937.  F. JUDGE  2,096,810
THREAD CUTTING DEVICE
Filed Sept. 25, 1935    3 Sheets-Sheet 2

INVENTOR
Franklin Judge
BY
Edwards, Bower and Pool
ATTORNEYS

Oct. 26, 1937.  F. JUDGE  2,096,810
THREAD CUTTING DEVICE
Filed Sept. 25, 1935   3 Sheets-Sheet 3
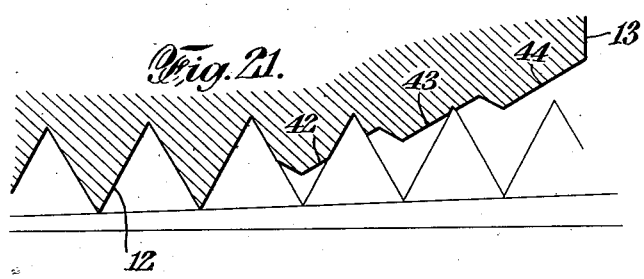
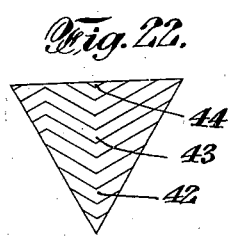
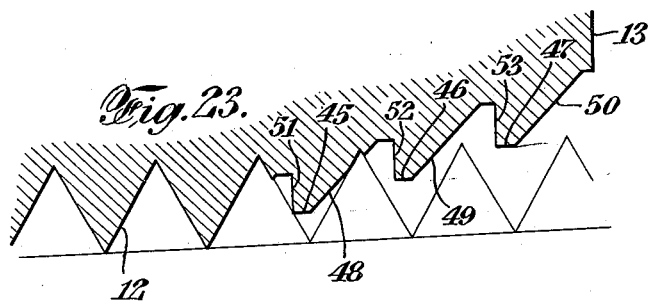
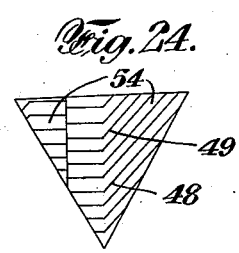
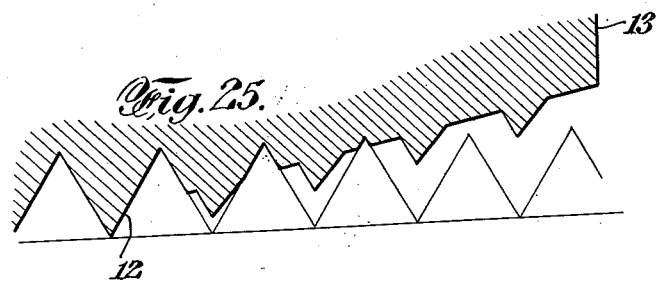
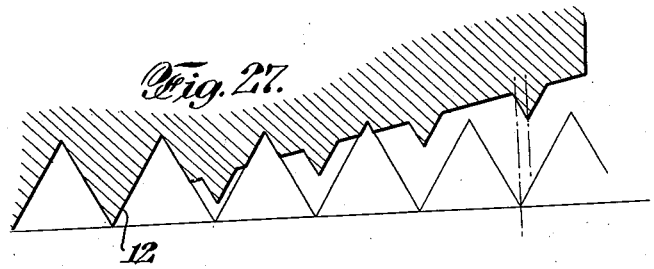
INVENTOR
Franklin Judge
BY
Edwards, Bower and Pool
ATTORNEYS Patented Oct. 26, 1937

2,096,810

UNITED STATES PATENT OFFICE 2,096,810

THREAD CUTTING DEVICE

Franklin Judge, Greenfield, Mass., assignor to Greenfield Tap and Die Corporation, a corporation of Massachusetts Application September 25, 1935, Serial No. 41,994

12 Claims. (Cl. 10—111)

This invention relates to screw thread cutting tools and has for its principal objects to facilitate starting of the tool and to ease the cutting operation after starting.

Ordinarily, thread cutting tools such as dies comprise a number of lands provided with cutting teeth thereon in helical continuation. To assist in starting in such cases as hand threading without the aid of a lead screw the mouth of the tool is usually chamfered, that is, some of the initial teeth are partially removed on a taper. Ordinarily the taper starts from a diameter slightly beyond the root of the thread at the face of the tool and ends at the crest of some thread, usually the third or fourth from the beginning.

When such chamfering is used, the tops of the chamfered teeth of the tool increase in width toward the face; and these wide surfaces offer considerable resistance in starting the threading operation.

It has been proposed to overcome this starting resistance by splitting the wide chamfered teeth into more threads per inch than the regular threads of the tool, or by threading the chamfered teeth deeper than the standard depth. Such starting devices have the disadvantage of leaving material on the work to be threaded, which increases the load on the remaining full teeth. This is especially true when threading pipe with taper threads.

To overcome these objections the thread cutting tool of this invention is provided with fine or small teeth protruding from the wide flat surfaces of the chamfer and having the same pitch as, and registering with, the regular threads of the tool. These fine or small teeth operate to take hold of the work to be threaded, regardless of whether it has a burr. They serve also to remove most of the material in the path of the following full teeth, thereby lightening the load on the full teeth.

Furthermore since the material removed by the small or fine teeth is located symmetrically in the path of the following full teeth there is little or no tendency for the tool to "back up" or "creep" on the work being threaded. When such backing up or creeping occurs imperfect threads are apt to form.

The invention will be better understood from the following detailed description of pipe thread cutting dies and the accompanying drawings, of which:

Figure 20:
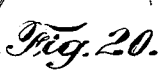

Figs. 8 to 19, inclusive, illustrate the cuts made by each of the successive initial teeth of the four lands;

Fig. 20 is a cross-section through a cut thread showing the cutting contributions of successive teeth;

Figs. 21, 23, 25, and 27 illustrate starting teeth differing in shape from those of Figs. 4 to 7; and Figs. 22, 24, 26 and 28 each show a cross-section of a cut tooth indicating the cutting contributions of the teeth of Figs. 21, 23, 25 and 27, respectively.

Figure 1:
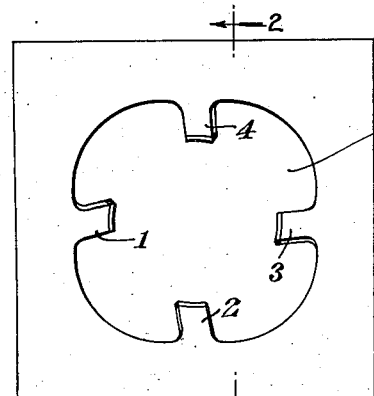
Fig. 1 is a face view of a pipe thread die having four lands provided with teeth embodying this invention.
Figure 2:
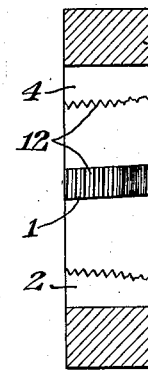
Fig. 2 is a side view in section, taken at line 2—2 of Fig. 1.

The pipe thread die of Figs. 1 and 2 comprises a solid base 10 having the usual center opening 11 through which the work to be threaded may protrude. Four lands 1, 2, 3 and 4, integral with the base and extending radially toward the center of the opening, are each provided with thread cutting teeth in a manner presently to be described.

Figure 3:
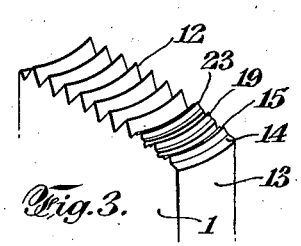
Fig. 3 is a perspective view of one of the lands of the die shown in Figs. 1 and 2.
Figure 4:
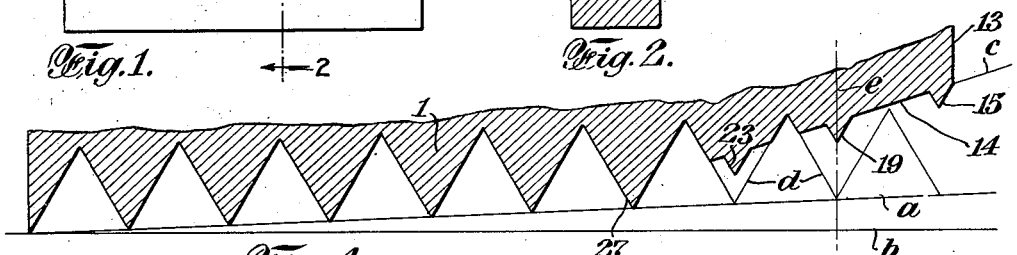
Figs. 4, 5, 6 and 7 are enlarged partial views of the four lands, respectively, on the die of Fig. 1.
Figure 5:
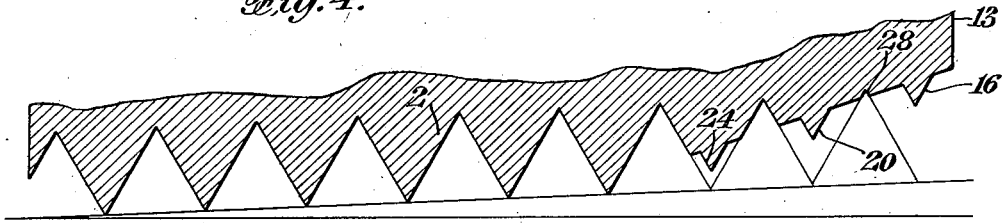
Figure 6:
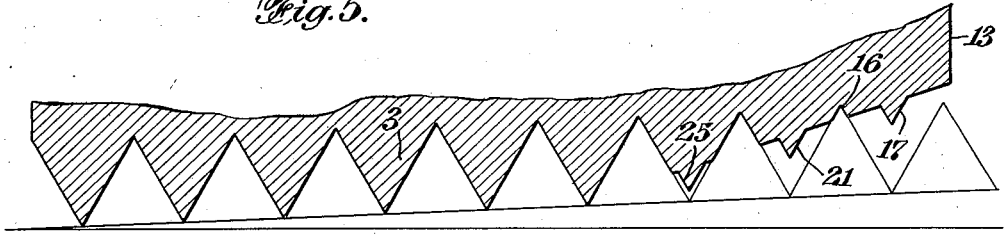
Figure 7:
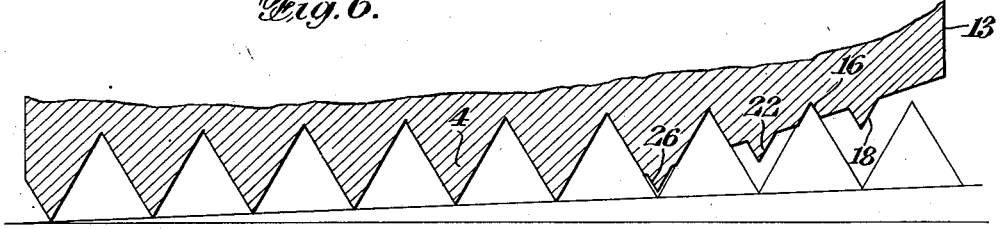

Pipe thread teeth 12 are formed on each of the lands in helical continuation. A chamfer is formed on a taper on the first three teeth adjacent the leading face 13 of the die, thereby removing the crests of these teeth and forming flat surfaces or shoulders 14. In accordance with this invention a tooth is formed on the flat shoulder of each chamfered tooth. Fig. 3, which is an enlarged perspective view of land 1 shows the formation of the small teeth 15, 19 and 23, each on one of the chamfered full teeth. These starting teeth have the same number of threads per inch as the regular full size teeth, and their crests are spiral continuations of those on the full teeth.

Figs. 4 to 7 are enlarged side views of the toothed portions of lands 1 to 4, respectively, and show the positions of the teeth on each of these lands. In these figures the light line "a" shows the line of the full tooth crests of the tapered pipe die. Line "b" shows the parallel to the axis of the teeth, which coincides with the axis of the work on which the threads are to be cut. The light line "c" indicates the taper of the chamfer. The light lines "d" show the positions the chamfered teeth would occupy if they were unchamfered. The vertical tooth center lines "e" show that the crests of the small teeth are at the center of the chamfered teeth. Following the spiral die thread around the die from lands 1 to 2 to 3 to 4 and so on around until the full cutting threads are reached, the starting teeth are numbered consecutively from 15 to 26, inclusive. Tooth 27 on land 1 is the first full tooth.

The first starting tooth 15 of land 1 is adjacent the leading face 13, and at each of the succeeding lands 2, 3 and 4 the first starting tooth is located progressively further from the face, in conformity with the spiral of the tooth. It is noted that the inverted V formed by the root 28 of the chamfered full teeth becomes progressively larger in passing back from face 13, from one land to the next until the V of the starting thread almost coincides with the crest of the full tooth, as shown at the third starting tooth in Fig. 7.

Figure 8:
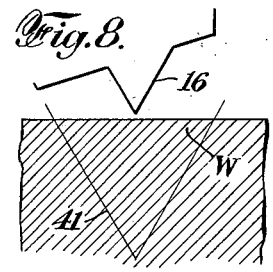
Figure 12:
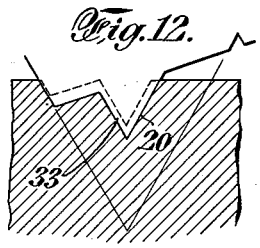
Figure 16:
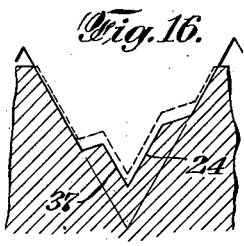
Figure 9:
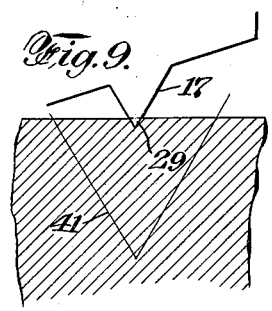
Figure 13:
Figure 17:
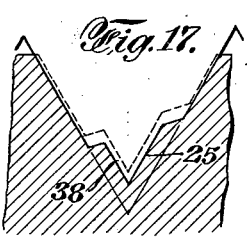
Figure 10:
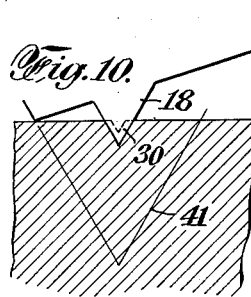
Figure 14:
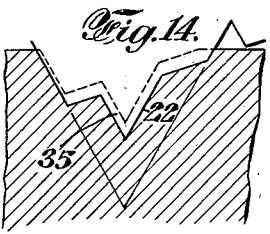
Figure 18:
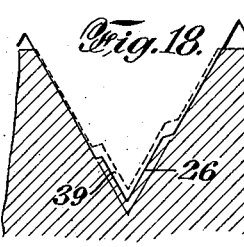
Figure 11:
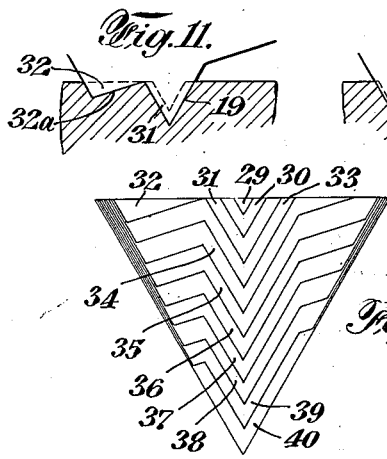
Figure 15:
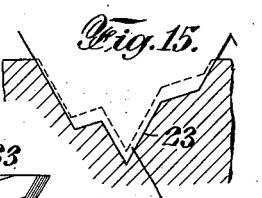
Figure 19:
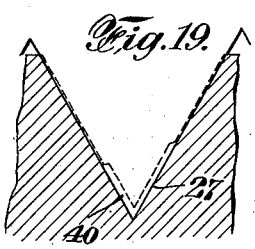

Figs. 8 to 19, inclusive, illustrate the cutting positions, on the work "W" being threaded, of each succeeding tooth 16 to 27, inclusive. The position of the first starting tooth 15 of land 1 is not shown in this group of figures because it is located quite far outside the outer diameter of the work, and, if it should strike anything, would only strike a large burr. Tooth 16 of land 2 is shown in Fig. 8 not quite in contact with the work. Tooth 17 of land 3 is shown in Fig. 9 to be making the first cut in the material; it is removing a small V-shaped chip or ribbon 29. The following tooth 18 on land 4 is shown removing a chevron 30 centered on the V 29 of Fig. 9. The position of the V 29 is shown in dotted lines to indicate how much material is removed by tooth 18. Fig. 11 shows the material removed by the next succeeding tooth which is the second starting tooth 19 of land 1. In addition to the chevron 31 there is removed a wedge-shaped chip 32 by the shoulder 32a of the chamfered tooth on which the small tooth 19 is built. The material removed by each of the next succeeding starting teeth is indicated by the numerals 33 to 39 in Figs. 12 to 18, respectively. The first full tooth 27 makes the cut 40 shown in Fig. 19. In each of Figs. 8 to 19 the dotted line indicates the condition in which the cut thread is left by the preceding tooth. The large V 41 shown in light lines in Figs. 8 to 18 indicates the cut which will finally be made by the first full tooth 27.

Fig. 20 is a composite sectional view showing the cut made by each of the teeth up to tooth 27. This figure clearly indicates the cutting contributions of the shoulders and root portions of the chamfered teeth. The side cuts due to the forward and rear faces of the successive chamfered teeth are shown exaggerated for the purpose of illustration. Actually, the sides of the cut will be shaved by the successive chamfered teeth, but not to the extent shown in Fig. 20. The numerals in the figure correspond to those in Figs. 9 to 19.

It is observed that the successive initial teeth and also the following full teeth cut thin chips or slivers which are symmetrical with respect to the preceding cut; the crests of all the starting teeth and of the following full teeth are aligned at the cut thread. In consequence the initial teeth, including the chamfered parts, leave very little material in the path of the full teeth, so that the load on the full teeth is considerably reduced. Furthermore, the substantially symmetrical character of the successive cuts practically removes any tendency for the die to "back up" or "creep" while cutting. Backing up or creeping is caused by the tendency of a cutting tooth to center itself in the cut; so if a tooth were cutting away more material on one side than on the other, it would tend to creep or back up in the direction which would equalize the cut on the two sides of the tooth. Such creeping or backing up, if it occurred, would injure the cut thread.

Figs. 21, 23, 25 and 27 show possible modifications of the starting teeth, and Figs. 22, 24, 26 and 28 are composite sectional views, similar to Fig. 20, showing the developments of the cut thread made by the teeth of Figs. 21, 23, 25 and 27, respectively. The slight side cuts, or shavings, made by the successive teeth are not obvious in Figs. 22, 24, 26 and 28; such cuts, or shavings, will actually occur in the manner shown in exaggerated form in Fig. 20.

In Fig. 21 the starting teeth, instead of being fine teeth, are coarse obtuse teeth 42, 43 and 44, which extend entirely across the chamfer of the chamfered teeth on which they are built. Fig. 22 shows that the symmetrical character of the cuts is substantially maintained.

The starting teeth 45, 46 and 47 of Fig. 23 are likewise formed entirely across the respective chamfered teeth. The forward walls 48, 49 and 50 of these starting teeth are slanting and the rear walls 51, 52 and 53 are vertical. The vertical rear walls serve to take a good grip on the material to be threaded. Fig. 24 shows the development of the cut thread; the cross section of the individual chips is shown by one of them, numbered 54.

Fig. 25 shows starting teeth somewhat similar to those of Figs. 4 to 8, except that the forward walls make a greater angle with the vertical than the rear walls.

Another possible variation is shown in Fig. 27 wherein the apices of the starting teeth are located ahead of the vertical line "f" (Fig. 28) through the apex of the full cut thread. The apices of these starting teeth occur along an oblique line "g"; that is, the pitch, or number of teeth per inch, is slightly greater than that of the full following teeth. This type of tooth removes more material at its rear wall than at its forward wall so that the tendency is for the tool to creep forward. This tendency would compensate for any opposite tendency which might exist in some cases at the following full teeth.

Although the invention has been described with particular reference to dies it should be understood that it is also applicable to taps. Hence the invention is not limited to dies, but only by the scope of the appended claims.

I claim:

1. A thread cutting tool comprising a plurality of lands each of which is provided with thread cutting teeth, a plurality of said teeth adjacent the leading face of said tool having a tapered chamfer, and small starting teeth built on the chamfered portions of said chamfered teeth, the crests of said starting teeth being on a taper which recedes from the crests of the full cutting teeth, the relation of said starting teeth to said chamfered teeth being such that the cut made by all of said starting and chamfered teeth nearly coincides with the path of a following full cutting tooth.

2. A thread cutting tool comprising a plurality of lands each of which is provided with thread cutting teeth, a plurality of said teeth adjacent the leading face of said tool having a tapered chamfer providing shoulders which become broader toward said leading face, and a small starting tooth built on at least some of said shoulders in such a position that the cut made by all of said starting and chamfered teeth very nearly equals, and is substantially symmetrical with respect to, the path of the first full cutting tooth, the crests of said starting teeth being on a taper which recedes from the crests of the full cutting teeth.

3. A thread cutting tool according to claim 2 in which the starting teeth are substantially V-shaped.

4. A thread cutting tool according to claim 2 in which the starting teeth are narrower than their associated chamfered shoulders so that a flat shoulder portion of a chamfered tooth extends on each side of the starting tooth built thereon.

5. A thread cutting tool according to claim 2 in which the starting teeth extend the full width of the chamfered portions of the associated chamfered teeth.

6. A thread cutting tool according to claim 2 in which each of said starting teeth has a rear wall which is more nearly vertical than the forward wall thereof.

7. A thread cutting tool according to claim 2 in which each of said starting teeth has a vertical rear wall and an oblique forward wall.

8. A die comprising cutting teeth for cutting an outside thread, said die having a chamfer providing flat teeth near its leading face, and small teeth located on said flat teeth, said small teeth having the same pitch as said cutting teeth and having crests which increase in diameter towards said face.

9. A thread cutting tool comprising cutting teeth the first few of which are chamfered to provide flat teeth and relatively small teeth formed on the chamfered teeth and having crests which taper away from the crests of the unchamfered cutting teeth, said small teeth having the same pitch as, and registering with, said cutting teeth whereby the cuts made by said small teeth lie substantially symmetrically in the path of the following cutting teeth.

10. A die comprising a leading face and a plurality of lands extending perpendicular to said face, said lands having cutting teeth thereon arranged in helical continuation, said teeth being chamfered at said face so that several consecutive teeth near said face are flattened, said flattened teeth being provided with relatively small teeth having the same number of teeth per inch and registering with said cutting teeth, the crests of said small teeth lying on a taper which is approximately parallel to the taper of the chamfer.

11. A die comprising cutting teeth and having a chamfer on some of the teeth adjacent the leading face of said die and small starting teeth built on said chamfered teeth, said starting teeth being all of substantially the same size and being substantially centrally located on, and having the same number of threads per inch as, said chamfered teeth, whereby said chamfered and starting teeth remove nearly all the material in the path of the following non-chamfered teeth.

12. A die comprising full cutting teeth and chamfered teeth near the leading face of said die, each of said chamfered teeth having substantially symmetrically built thereon a small starting tooth, said starting teeth having crests which increase in diameter toward said face and having the same number of threads per inch as, and being aligned in the cut thread with, the following full teeth, whereby said full teeth are not required to remove more than a small amount of additional material.

FRANKLIN JUDGE.